(12) United States Patent
Pinto et al.

(10) Patent No.: US 12,265,719 B2
(45) Date of Patent: Apr. 1, 2025

(54) SYSTEMS AND METHODS FOR DATA TRANSFER FOR COMPUTATIONAL STORAGE DEVICES

(71) Applicant: Samsung Electronics Co., Ltd., Suwon-si (KR)

(72) Inventors: Oscar P. Pinto, San Jose, CA (US); Ramdas P. Kachare, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/495,810

(22) Filed: Oct. 6, 2021

(65) Prior Publication Data

US 2022/0236902 A1    Jul. 28, 2022

Related U.S. Application Data

(60) Provisional application No. 63/241,525, filed on Sep. 7, 2021, provisional application No. 63/144,469, filed on Feb. 1, 2021, provisional application No. 63/142,485, filed on Jan. 27, 2021.

(51) Int. Cl.
*G06F 3/06* (2006.01)
*G06F 9/54* (2006.01)

(52) U.S. Cl.
CPC .......... *G06F 3/0644* (2013.01); *G06F 3/0622* (2013.01); *G06F 3/067* (2013.01); *G06F 9/544* (2013.01)

(58) Field of Classification Search
None
See application file for complete search history.

(56) References Cited

U.S. PATENT DOCUMENTS

| 5,805,777 A | 9/1998 | Kuchta |
| 6,976,255 B1 | 12/2005 | Clark et al. |
| 7,315,807 B1 | 1/2008 | Lavallee et al. |

(Continued)

FOREIGN PATENT DOCUMENTS

| CN | 102929813 B | 6/2016 |
| KR | 20120071060 A | 7/2012 |

(Continued)

OTHER PUBLICATIONS

Office Action for U.S. Appl. No. 17/234,780, mailed Jan. 5, 2023.

(Continued)

*Primary Examiner* — Edward J Dudek, Jr.
*Assistant Examiner* — Ralph A Verderamo, III
(74) *Attorney, Agent, or Firm* — Renaissance IP Law Group LLP

(57) ABSTRACT

Provided are systems, methods, and apparatuses for managing memory. The method can include: establishing a connection via an interface, between a host device and a storage device; and transferring data, via the interface, between first memory associated with the host device and second memory associated with the storage device by performing a data operation on the second memory by an application executed by the host, where the storage device includes a processing element that accelerates the data operation by performing at least one offload function on the data operation.

18 Claims, 13 Drawing Sheets

(56) References Cited

U.S. PATENT DOCUMENTS

| | | | |
|---|---|---|---|
| 7,433,931 | B2 | 10/2008 | Richoux |
| 7,801,931 | B2 | 9/2010 | Tunar et al. |
| 7,937,703 | B2 | 5/2011 | Bethea et al. |
| 8,381,004 | B2 | 2/2013 | Elnozahy et al. |
| 8,615,570 | B2 | 12/2013 | Brewis et al. |
| 8,726,299 | B1 | 5/2014 | Bromley et al. |
| 8,904,072 | B2 | 12/2014 | Lee |
| 8,943,504 | B2 | 1/2015 | Vijayarajan et al. |
| 9,203,627 | B2 | 12/2015 | Edstrom et al. |
| 9,398,016 | B1 | 7/2016 | Chakraborty et al. |
| 9,406,082 | B2 | 8/2016 | Smedberg et al. |
| 9,596,135 | B1 | 3/2017 | Thomas et al. |
| 9,626,120 | B1 | 4/2017 | Jia et al. |
| 10,162,793 | B1 | 12/2018 | Bshara et al. |
| 10,303,382 | B1 | 5/2019 | Chu et al. |
| 10,359,953 | B2* | 7/2019 | Cargnini ............... G06F 3/065 |
| 10,394,746 | B2 | 8/2019 | Kachare et al. |
| 10,404,811 | B2 | 9/2019 | Ly et al. |
| 10,412,187 | B2 | 9/2019 | Busayarat et al. |
| 10,476,936 | B1 | 11/2019 | Retnakumari et al. |
| 10,521,114 | B2 | 12/2019 | Thomas |
| 10,621,114 | B1 | 4/2020 | Bshara et al. |
| 10,637,962 | B2 | 4/2020 | Gay et al. |
| 10,771,340 | B2 | 9/2020 | Ballapuram |
| 10,795,726 | B2 | 10/2020 | Fujii et al. |
| 10,802,753 | B2 | 10/2020 | Kabra et al. |
| 10,838,905 | B2 | 11/2020 | Zou et al. |
| 10,846,096 | B1 | 11/2020 | Chung et al. |
| 10,860,511 | B1* | 12/2020 | Thompson ............. G06F 13/28 |
| 10,877,750 | B1 | 12/2020 | Connolly et al. |
| 11,294,576 | B2* | 4/2022 | Khan ................. G06F 3/0643 |
| 11,334,382 | B2 | 5/2022 | Bernat et al. |
| 11,474,974 | B2 | 10/2022 | Lutz et al. |
| 11,507,298 | B2* | 11/2022 | Yang ................. G06F 3/0679 |
| 11,630,921 | B2 | 4/2023 | Sinha et al. |
| 11,687,498 | B2 | 6/2023 | Trika et al. |
| 2003/0093572 | A1 | 5/2003 | Laux et al. |
| 2004/0220918 | A1 | 11/2004 | Scriffignano et al. |
| 2005/0132341 | A1 | 6/2005 | Lanzatella et al. |
| 2007/0276924 | A1 | 11/2007 | Newton et al. |
| 2008/0004887 | A1 | 1/2008 | Brunswig et al. |
| 2008/0279161 | A1 | 11/2008 | Stirbu et al. |
| 2011/0066676 | A1 | 3/2011 | Kleyzit et al. |
| 2011/0185295 | A1 | 7/2011 | Kashida |
| 2012/0079172 | A1 | 3/2012 | Yoshida |
| 2012/0152576 | A1 | 6/2012 | Bassinger et al. |
| 2012/0162234 | A1* | 6/2012 | Blinzer ................ G06T 1/20 |
| | | | 345/501 |
| 2013/0173662 | A1 | 7/2013 | Kaplinger et al. |
| 2014/0143778 | A1 | 5/2014 | Gopal et al. |
| 2014/0310332 | A1 | 10/2014 | Huang et al. |
| 2015/0319246 | A1* | 11/2015 | Ishizaka ............ H04L 67/1097 |
| | | | 709/217 |
| 2016/0012128 | A1 | 1/2016 | Siebler et al. |
| 2016/0054931 | A1* | 2/2016 | Romanovsky ........ G06F 3/0643 |
| | | | 711/103 |
| 2016/0328344 | A1 | 11/2016 | Jose et al. |
| 2017/0249088 | A1 | 8/2017 | Thomas |
| 2018/0063145 | A1 | 3/2018 | Cayton et al. |
| 2018/0352038 | A1 | 12/2018 | Sathyanarayana et al. |
| 2019/0037280 | A1 | 1/2019 | Yang et al. |
| 2019/0349281 | A1 | 11/2019 | Oztaskent et al. |
| 2020/0050480 | A1* | 2/2020 | Cao .................... G06F 3/067 |
| 2020/0057578 | A1 | 2/2020 | Benisty et al. |
| 2020/0081640 | A1 | 3/2020 | Enz et al. |
| 2020/0117517 | A1* | 4/2020 | Costa .................. G06F 9/546 |
| 2020/0167098 | A1 | 5/2020 | Shah et al. |
| 2020/0183582 | A1 | 6/2020 | Kachare et al. |
| 2020/0192592 | A1 | 6/2020 | Song et al. |
| 2020/0201575 | A1 | 6/2020 | Mizrahi |
| 2020/0301898 | A1* | 9/2020 | Samynathan ....... G06F 16/2453 |
| 2020/0310694 | A1* | 10/2020 | Gao .................... G06F 3/0683 |
| 2020/0379781 | A1 | 12/2020 | Rachapudi et al. |
| 2021/0026560 | A1* | 1/2021 | Pillai ................. G11C 16/20 |
| 2021/0247922 | A1 | 8/2021 | Song et al. |
| 2021/0303159 | A1* | 9/2021 | Ke .................... G06F 12/0246 |
| 2021/0377117 | A1* | 12/2021 | Kanevsky ........... H04L 41/0843 |
| 2022/0058137 | A1* | 2/2022 | Xu .................... G06F 13/4221 |
| 2022/0188028 | A1* | 6/2022 | Mesnier ................ G06F 3/061 |
| 2022/0236911 | A1* | 7/2022 | Jones .................. G06F 3/0679 |
| 2022/0295255 | A1 | 9/2022 | Karampatsis et al. |
| 2023/0244499 | A1 | 8/2023 | Gupta et al. |

FOREIGN PATENT DOCUMENTS

| | | |
|---|---|---|
| KR | 20140001970 A1 | 1/2014 |
| KR | 20170121661 A | 11/2017 |
| KR | 20180106822 A | 10/2018 |
| KR | 20200068564 A | 6/2020 |
| TW | 200622673 A | 7/2006 |
| TW | 201214288 A | 4/2012 |
| WO | 2002097610 A1 | 12/2002 |

OTHER PUBLICATIONS

Anandan, Sabby et al., "Industry Paper: Spring XD—A Modular Distributed Stream and Batch Processing System," DEBS '15: Proceedings of the 9th ACM International Conference on Distributed Event-Based Systems, Jun. 2015, pp. 217-225.
Carbone, Paris et al., "Apache Flink™: Stream and Batch Processing in a Single Engine," Bulletin of the IEEE Computer Society Technical Committee on Data Engineering, vol. 36, No. 4, 2015, pp. 28-38.
European Extended Search Report for Application No. 21190626.8, mailed Jan. 28, 2022.
European Extended Search Report for Application No. 21212137.0, mailed Apr. 28, 2022.
Fisher, Mark et al., "Spring XD Guide", 1.3.3.BUILD-SNAPSHOT, 2013, 400 pages.
NVM Express, Inc., "NVM Express TM over Fabrics Revision 1.1," Oct. 22, 2019, pp. 1-83, XP055877791, Retrieved from the Internet: URL:https://nvmexpress.org/wp-content/uploads/NVMe-over-Fabrics-1.1-2019.10.22-Ratified.pdf, retrieved on Jan. 11, 2022.
Torabzadehkashi, Mahdi, et al. "Computational Storage: An Efficient and Scalable Platform for Big Data and HPC Applications," Journal of Big Data, vol. 6, No. 1, 2019, pp. 1-29.
Final Office Action for U.S. Appl. No. 17/234,780, mailed Aug. 17, 2023.
Office Action for U.S. Appl. No. 17/234,780, mailed Dec. 22, 2023.
Office Action for U.S. Appl. No. 17/359,495, mailed Dec. 7, 2023.
Office Action for U.S. Appl. No. 17/502,023, mailed Oct. 5, 2023.
Bates, Stephen, "Accelerating RocksDB with Eideticom's NoLoad NVMe-based Computational Storage Processor," Storage Developer Conference 2019, Sep. 2019, retrieved from the Internet: URL:https://www.snia.org/sites/defaultifiles/SDC/2019/presentations/Computational/Bates_Stephen_Accelerating_RocksDB_with_Eideticom's_NoLoad_NVMe-based_ComputationalStorage_Processor.pdf [retrieved on Feb. 8, 2024], 16 pages.
Chambers, Bill et al., "Spark, The Definitive Guide: Big Data Processing Made Simple", first 400 pages, Feb. 2018, retrieved from the Internet:URL:https://analyticsdata24.files.wordpress.com/2020/02/spark-the-definitive-guide40www.bigdatabugs.com_.pdf [retrieved on Jan. 18, 2024], 400 pages.
European Summons to Oral Proceedings for Application No. 21190626.8, mailed Feb. 15, 2024.
European Summons to Oral Proceedings for Application No. 21190952.8, mailed Jan. 25, 2024.
Gounaris, Anastasios et al., "Dynamic Configuration of Partitioning in Spark Applications," IEEE Transactions on Parallel and Distributed Systems, vol. 28, No. 7, Jul. 2017, [retrieved on Jun. 10, 2017], pp. 1891-1904.
Molgaard, Jason, "A Simple Approach to Implementing Computational Storage," Storage Developer Conference 2019, Sep. 2019, retrieved from the Internet:URL:https://www.snia.org/sites/defaultifiles/SDC/2019/presentations/Computational/Molgaard_Jason_A_Simple_Approach_to_Implementing_Computational_Storage.pdf [retrieved on Feb. 8, 2024], 25 pages.

(56) References Cited

OTHER PUBLICATIONS

Prasaad, Guna et al., "Improving High Contention OLTP Performance via Transaction Scheduling", arXiv.org, Oct. 2018, retrieved from the Internet: URL:https://arxiv.org/pdf/1810.01997.pdf [retrieved on Jan. 17, 2024], 15 pages.
Sabiu, Habib Ado, "Performance Evaluation of Job Scheduling and Resource Allocation in Apache Spark," Jul. 2018, retrieved from the Internet: URL:https://harvest.usask.ca/server/api/core/bitstreams/9654d97a-5217-486d-b8ae-df305acfc5b8/content [retrieved on Jan. 17, 2024], 104 pages.
Shadley, Scott et al., "What Happens When Compute Meets Storage?," Sep. 2019, retrieved from the Internet:URL:https://www.snia.org/sites/defaultifiles/SDC/2019/presentations/Computational/Shadley_Scott_Adams_Nick_What_Happens_when_Compute_meets_Storage_Computational_Storage_TWG.pdf [retrieved on Jan. 13, 2022], 28 pages.
SNIAVIDEO: "What Happens when Compute Meets Storage (SDC 2019)," Oct. 2019, retrieved from the Internet: URL:https://www.youtube.com/watch?=45nhck3tN4U [retrieved on Feb. 8, 2024], 2 pages.
Tang, Shanjiang et al., "A Survey on Spark Ecosystem for Big Data Processing," arxiv.org, Nov. 2018, 21 pages.
Wikipedia, "Message Broker," Jul. 2020, retrieved from the Internet: URL:https://en.wikipedia.org/w/index.php?title=Message_broker&0ldid=966520924 [retrieved on Jan. 18, 2024], 3 pages.
Final Office Action for U.S. Appl. No. 17/234,780, mailed Jul. 5, 2024.
Final Office Action for U.S. Appl. No. 17/502,023, mailed Jun. 20, 2024.
Office Action for U.S. Appl. No. 17/359,495, mailed Aug. 12, 2024.
Castellani, Angelo P. et al., "WebIoT: A Web Application Framework for the Internet of Things," WCNC 2012 Workshop on Internet of Things Enabling Technologies, Embracing Machine-to-Machine Communications and Beyond, 2012, pp. 202-207.
European Office Action for Application No. 22174076.4, mailed Jul. 8, 2024.
Kerdoudi, Mohamed Lamine et al., "Recovering Software Architecture Product Lines," 2019 24th International Conference on Engineering of Complex Computer Systems (ICECCS), 2019, pp. 226-235.
European Office Action for Application No. 21190952.8, mailed Oct. 18, 2024.
European Office Action for Application No. 21212137.0, mailed Oct. 25, 2024.
Li, Yonghui et al., "Architecture and Analysis of a Dynamically-Scheduled Real-Time Memory Controller," Real-Time Systems, Jul. 2015, vol. 52, pp. 675-729.
Li, Yonghui, "Design and Formal Analysis of Real-Time Memory Controllers," Phd Thesis 1 (Research TU/e /Graduation TU/e), Electrical Engineering, Sep. 2016, 207 pages.
Mutlu, Onur et al., "Parallelism-Aware Batch Scheduling: Enhancing both Performance and Fairness of Shared DRAM Systems," International Symposium on Computer Architecture, ACM Sigarch Computer Architecture News, 2008, vol. 36, Issue 3, pp. 63-74.
Prieto, Pablo et al., "CMP Off-Chip Bandwidth Scheduling Guided by Instruction Criticality," ICS '13: Proceedings of the 27th International ACM Conference on International Conference on Supercomputing, Jun. 2013, pp. 379-388.
Zhou, Ping et al., "Throughput Enhancement for Phase Change Memories," IEEE Transactions on Computers, vol. 63, No. 8, Aug. 2014, pp. 2080-2093.
Notice of Allowance for U.S. Appl. No. 17/502,023, mailed Nov. 26, 2024.
Office Action for U.S. Appl. No. 17/234,780, mailed Dec. 19, 2024.
Warke, Amit, et al. "Storage Service Orchestration with container Elasticity," 2018 IEEE 4th International Conference on Collaboration and Internet Computing (CIC), IEEE, 2018, pp. 283-292.
Notice of Allowability for U.S. Appl. No. 17/502,023, mailed Feb. 4, 2025.

\* cited by examiner

| Bytes | Description |
|---|---|
| | Computational Storage Capabilities: |
| 1934 | <table><tr><th>Bits</th><th>Description</th></tr><tr><td>7:2</td><td>Reserved</td></tr><tr><td>1</td><td>Device memory address protection enabled</td></tr><tr><td>0</td><td>Device memory allocations managed by controller if bit is set to 1. If this bit is set to zero, then device memory is managed by host.</td></tr></table> |
| 1935 | Device Memory Data Granularity (DMDG): This field indicates the granularity and alignment requirement of Compute Memory for Data usage. This type of memory shall be allocated at this granularity. For the broadest interoperability with host software, it is recommended that the controller set this value to the lowest value possible. |

*Host Data Pointer*

| Bits | Description |
|---|---|
| 127:00 | Data Pointer (DPTR): This field specifies where data is transferred to from Compute Memory for Data. Refer to NVMe Base Specifications for details on PRP and SGL entries. |

*Transfer Size: Command Dword 10*

| Bits | Description |
|---|---|
| 31:00 | Number of Dwords (NUMD): This field specifies the number of dwords to transfer of the Compute Memory for Data contents. This is a 0's based value. If the value specified in this field does not meet the requirement indicated by the DMDG field |

*Device Data Pointer: Command Dword 11 and Command Dword 12*

| Bits | Description |
|---|---|
| 63:00 | Device Memory Data Address (DMDA): This field indicates the starting address of the Device Memory for Data to be read as part of the operation. |

FIG. 6

SGL Descriptor Format for Compute Programs

| Bytes | Description |
|---|---|
| 15 | SGL Identifier: The definition of this field is described in table below.<br><br>  \| Bits \| Description \|<br>  \|---\|---\|<br>  \| 07:04 \| SGL Descriptor Type: (Set to 9) \|<br>  \| 03:00 \| SGL Descriptor Sub Type: (Set to 1) \| |
| 14:11 | Reserved |
| 10:08 | Length: Length of transfer from Offset whose granularity is defined by the CMDG field in Identify Controller. |
| 07:00 | Offset: Offset from the start of Compute Memory for Data |

FIG. 7

SYSTEMS AND METHODS FOR DATA TRANSFER FOR COMPUTATIONAL STORAGE DEVICES

CROSS-REFERENCE TO RELATED APPLICATIONS

This application claims the benefit of U.S. Provisional Patent Application Ser. No. 63/241,525, filed Sep. 7, 2021; U.S. Provisional Patent Application Ser. No. 63/144,469, filed Feb. 1, 2021; and U.S. Provisional Patent Application Ser. No. 63/142,485, filed Jan. 27, 2021, which are incorporated by reference herein for all purposes.

FIELD

The disclosure relate generally to a storage system, and more particularly to systems and methods for data transfer for computation storage devices.

BACKGROUND

The present background section is intended to provide context only, and the disclosure of any concept in this section does not constitute an admission that said concept is prior art.

With advances in technology, the size and amount of data is increasing rapidly as data is collected by devices such as mobile devices, Internet of things devices, aerial (remote sensing) devices, software logs, cameras, microphones, radio-frequency identification (RFID) readers, wireless sensor networks, and the like. To process and use information represented by the collected data, storage devices, processing elements, and servers are often used in datacenters to filter, compute, store, and perform related operations on the data. A need remains for systems and methods that improve data transfers in storage devices.

The above information disclosed in this Background section is only for enhancement of understanding of the background of the disclosure and therefore it may contain information that does not constitute prior art.

SUMMARY

In various embodiments, described herein include systems, methods, and apparatuses for data transfers for computation storage devices.

In various embodiments, a method to manage memory is described. The method includes: establishing a connection, via an interface, between a host device and a storage device; and transferring data, via the interface, between first memory associated with the host device and second memory associated with the storage device by performing a data operation on the second memory by an application executed by the host, where the storage device includes a processing element that accelerates the data operation by performing at least one offload function on the data operation.

In one embodiment, the interface includes an application programming interface (API), and the host device allocates the second memory using at least one command associated with the API. In another embodiment, the host device allocates the second memory using a fine-grained allocation scheme or a coarse-grained allocation scheme. In one embodiment, the method further includes addressing the second memory and the transferring data is based at least in part on the addressing of the second memory. In some embodiments, second memory includes a secure address space, and where the method further includes host device performing one or more multitenant operations based on the secure address space.

In another embodiment, the storage device includes a non-volatile memory express (NVMe) enabled storage device and the data operation is performed using a scatter gather list (SGL). In some embodiments, the performing the data operation further includes the storage device transferring data from persistent memory associated with the storage device to the second memory. In one embodiment, the transferring data further includes the host device providing information regarding host device layout to the storage device. In another embodiment, the transferring data further includes the storage device providing information regarding the storage device's memory layout for read and write operations to the host device. In some embodiments, the establishing the connection includes a discovery and setup process.

Similarly, non-transitory computer-readable media, devices, and systems for performing substantially the same or similar operations as described above are further disclosed.

Accordingly, particular embodiments of the subject matter described herein can be implemented so as to realize one or more of the following advantages. Reduce network latencies and improve network stability and operational data transfer rates and, in turn, improve the user experience. Reduce costs associated with routing network traffic, network maintenance, network upgrades, and/or the like. Further, in some aspects, the disclosed systems can serve to reduce the power consumption and/or bandwidth of devices on a network, and may serve to increase the speed and/or efficiency of communications between devices. Moreover, the disclosed systems and methods can serve to provide a seamless mechanism that works for direct-attached and network-attached drives. In another aspect, the disclosed mechanisms can provide scaling at least because the device memory may not be exposed to host. Further, the disclosed mechanisms can be applied to a computational storage device (e.g., a storage device having a processing functionality) and related systems. As noted, the disclosed systems have the advantage of not exposing device memory. Thus, the disclosed systems do not necessarily need to have their memory be populated by system software in host's system virtual address space. In other aspects, the disclosed systems can be used in connection with any suitable storage device such as a non-NVMe solid state drives (SSDs). Further, the disclosed systems and methods can be standardized and applied to a range of storage devices and related systems while being agnostic to vendor.

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 4 is an illustration of an exemplary data structure device may advertise its memory management and usage capabilities, in accordance with example embodiments of the disclosure.

FIG. 6 is an illustration of an exemplary non-volatile memory express (NVMe) command contains a scatter gather list (SGL) having corresponding fields, in accordance with example embodiments of the disclosure.

FIG. 7 is an illustration of an exemplary type of SGL mechanism that is employed to keep memory usage similar for local and remote-attached computational storage devices, in accordance with example embodiments of the disclosure.

Figure 1:
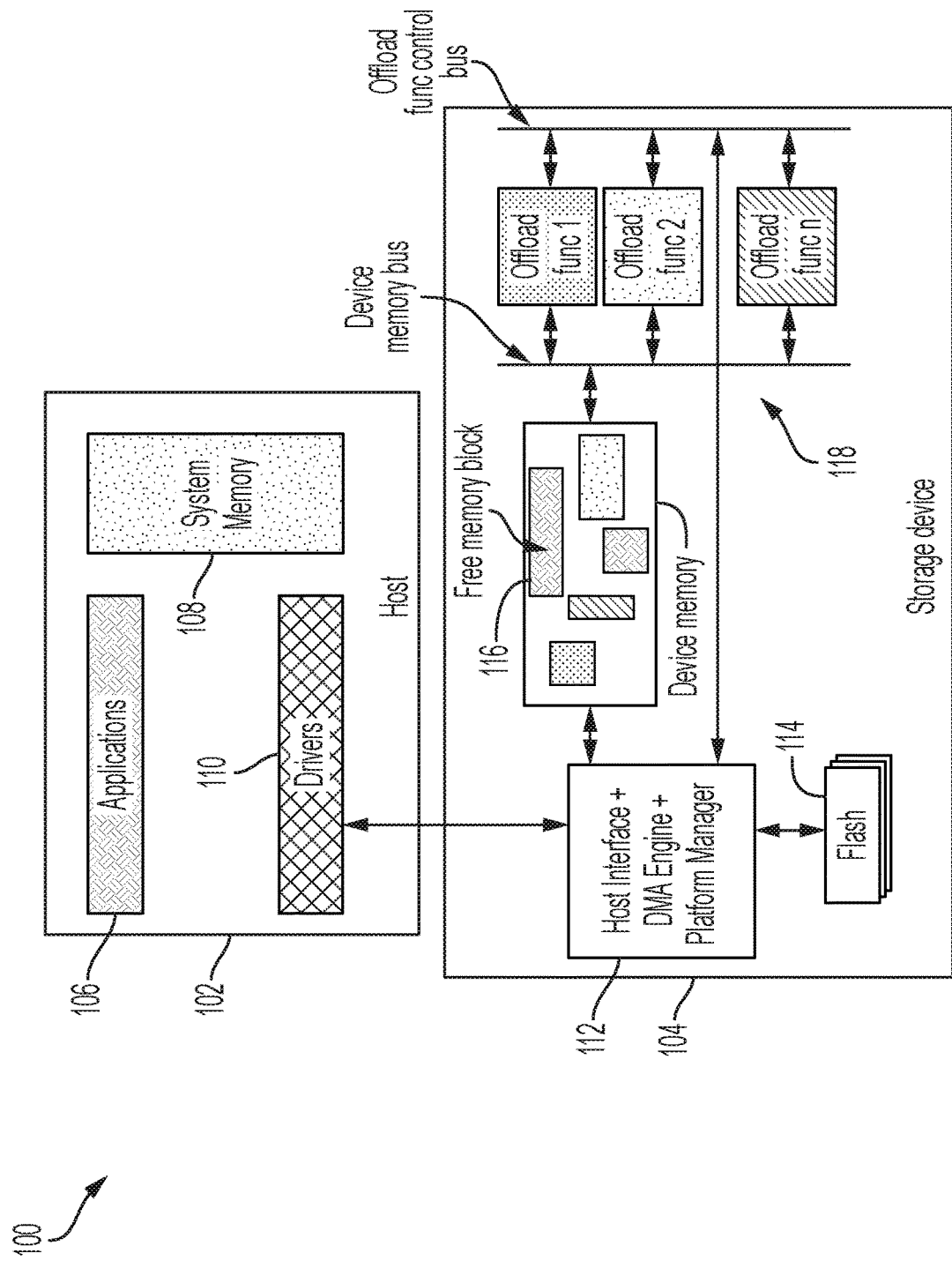
FIG. 1 is an illustration of an exemplary architecture for enabling data processing functions to be offloaded to a storage device, in accordance with example embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state moduyle (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Background and Problem Statement

Computational storage devices can serve to enhance storage functionality uses, for example, by performing near-storage acceleration operations. In particular, the disclosed systems can perform accelerator device-based processing of storage data. In some respects, storage devices such as solid state storage devices (SSDs) can be configured to operate with any suitable protocol such as non-volatile memory express (NVMe). Such NVMe-enabled SSDs may have lower latencies than non-NVMe SSDs and can support greater storage capacities. In other respects, such SSDs can include multiple device input-output (I/O) queues, and thereby provide greater parallelism for storage. In some aspects, some Peripheral Component Interconnect Express (PCIe) based devices (e.g., PCIe generation 3 (Gen3) having 4 lanes or 8 lanes (x4 and x8 devices)) may saturate corresponding PCIe bandwidth limits and may thus limit device scaling. Accordingly, even if the SSD can provide a certain level of performance, the SSD may not be able to be used when multiple such devices are utilized in a server due to various system design limitations. Further, scaling SSDs in a server in connection with some PCIe generations (for example generation 4, Gen4) may have similar behaviors, for example, since the SSD may have higher performance and may saturate the PCIe limits per device. This similar behavior may be due to the PCIe lane count across devices; however, the SSDs may be limited by the total addressability of modern CPUs and the intended PCIe bus. (The above generations and corresponding lane counts are used as examples and merely for the purpose of illustration, and are not to be construed as limiting to the disclosed embodiments in any way.)

With computational storage device peer-to-peer (P2P) technology, a processing element (e.g., a field-programmable gate array, FPGA) device memory can be mapped to a host address space; thus, an application can use this mapped address and read or write data directly to and from the SSD bypassing the host PCIe bus. Such a technique may work in situations in which the corresponding server supports such mapping. However, some servers may not support such mapping. Accordingly, as the device memory size increases, servers set restrictions in their BIOS to not map such large memories to host address space. Additionally, as multiple devices are scaled, the server may stop performing additional mappings thus limiting the device's capability, and causing further scaling issues. This can be due to the fact that the memory address space may be preconfigured by the server vendor, thereby restricting scaling for devices with large memories. In some cases, the usage of devices with large memories may be limited to a few devices (e.g., 1-6 devices) per server. In various aspects, computational storage provides the means to expand that capability by P2P.

In some aspects, with certain protocols such as NVMe over fabrics (NVMe-oF) protocols and devices, the SSD can support network-attached modes of operation (as opposed to device attached modes of operation) without exposing the underlying interface details. However, the computational storage device or any device that utilizes such a mechanism may not function adequately since the device's memory mapping may not apply on the network for remote devices.

Further Limitations

In some aspects, device memory mapped to a host address space (e.g., as a PCIe base address register, BAR) can have various limitations, as further described below. In particular, one limitation may include the fact that not all basic input output systems (BIOSs) treat the extra device memory equally. This may be due to the fact that many BIOSs employ legacy code that typically deal with allocations that work well for the host's dynamic random access memory (DRAM). Further, some BIOSs may not tolerate large device memories and if detected disable that resource from being initialized. Accordingly, there may be commands (e.g., PCIe configuration commands) to set the memory size for such devices so that BIOSs that support such commands will work with them. Moreover, BIOSs may not provide enough memory head-room for device memories. Accordingly, when multiple device memories get initialized with multiple such devices, the multiple device memories can run into memory address limitations due to this issue. Device scaling may get limited to a smaller number than what the server can accommodate without these visible additional device memories. In various respects, some memory behind PCIe BARs may not work when these devices are remote fabric attached through a network such as Ethernet, remote direct memory access (RDMA) over Converged Ethernet (RoCE), InfiniB and, Fibre Channel (FC) and so forth. This may be due to the fact that the memory map may be a local resource only that primarily works with local attached PCIe.

Solution

In various aspects, computational storage (also referred to as near-storage computing) can enable certain data processing functions to be offloaded to the storage device. In some respects, the offloaded functions are also called as acceleration engines or acceleration kernels. Moreover, the offloaded functions can have compute resources and device local memory resources to perform the desired data processing functions. In another aspect, there can be multiple offloaded functions present and active in such a storage device. Such architectures may need a low overhead device memory management mechanism. The disclosure proposes multiple methods of efficient device memory management for these purposes.

In various embodiments, the disclosed systems and methods include mechanisms for a storage device such as an SSD to transfer data such as read and write data from the storage medium to a co-device's memory. In another embodiment, the disclosed systems and methods include a device mechanism to translate device memory layout for reads and writes. In some embodiments, the disclosed systems describe a mechanism for the host to describe internal device layout to storage device without host system address space mapping and host translations. In some respects, the device layout can include a device mechanism to translate device memory for internal transfers between one or more devices situated internally within the same device. The translations are not exposed to the host and thereby kept private and secured. Further, the translations may have a requirement to be mapped into host address space. The host can include a virtual mapping mechanism that can include an offset between the start of this device memory (e.g., at 0h) to the end of this device memory, which can denote the length of this memory. In one embodiment, the disclosed systems and methods include a mechanism to discover and setup this feature, and further include a mechanism to apply host logic transparently for device that is direct attached or network attached, and can be implemented at least in part on a storage device such as a computational SSD.

In some embodiments, the disclosed systems and methods include transferring data between storage device and one or more co-devices for peer-to-peer (P2P) data transfers of read and write data within the device and without going to external connections such as a PCIe bus. In one embodiment, the disclosed systems provide internal device memory mapping to the storage device for P2P transfers, and such transfers can occur without involving host's system address mapping of virtual and physical addresses provided by an operating system memory manager. In another embodiment, the disclosed systems permit abstracting internal mapping for host software command descriptions. In one embodiment, the disclosed systems provide a mechanism to transfer data between a device and it co-device and the ability of this functionality to scale to the maximum supported storage devices without causing system limits. In some respects, the disclosed systems provide mechanism for transmitting data between a storage device (SSD) and its co-device without host system address translations in the I/O path.

FIG. 1 is an illustration of an exemplary architecture for enabling data processing functions to be offloaded to a storage device, in accordance with example embodiments of the disclosure. Diagram 100 shows a diagram including the components involved in this architecture.

In various embodiments, diagram 100 shows host 102 that includes application 106, system memory 108, and drivers 110. In some embodiments, application 106 can include any suitable program being executed or partially executed on the host. In another embodiment, system memory 108 can include DRAM, Static Random Access Memory (SRAM), flash memory or any suitable volatile memory and can further include both logical and physical forms of memory. In some embodiments, the drivers 110 can include software or firmware that has specific instructions for the host software to communicate with the a corresponding connection at an external device similar, but not necessarily identical to, storage device 104, to be described below.

In various embodiments, storage device 104 can include a solid state drive (SSD) or otherwise include flash memory. Further details of storage device 104 are provided below. In some embodiments, storage device 104 can include a device manager 112, which can further serve as a host interface, direct memory access (DMA) engine, and a platform manager. In some embodiments, the device manager 112 can interface with the host 102 through drivers 110. In some embodiments, storage device 104 can include flash 114 or any other suitable form of non-volatile memory. Further, the flash 114 can be connected to the device manager 112.

In some embodiments, storage device 104 can include device memory 116, which can include any suitable volatile memory and can further include both logical and physical forms of memory. The device memory 116 can include free memory blocks which can be utilized by the device manager 112 during function offload as described further herein. In some embodiments, storage device 104 various offload functions 118 (e.g., offload function 1, offload function 2, . . . , offload function n), as described further below, and which can be connected to one another (via a offload function control bus) and to the device memory 116 (via a device memory bus).

Having described the components and connections between components in diagram 100, we now turn to a discussion of the functional aspects of the device. As shown in diagram 100, an offloaded function 118 can access to the device memory 116 for at least the following purposes: 1) input source data for processing, 2) intermediate results storage, 3) final results storage, and 4) other functions. In some embodiments, a device manager 112 can perform offload manager or acceleration management in the storage device 104 can fetch data from host 102 system memory 108 and deposit in the device memory 116 so that the offloaded function 118 can process it. Similarly, the offload function 118 can pick the results data from the device memory 116 and deposit that data into the system (e.g., host) memory 108 or persistent memory (e.g., non-volatile memory) such as flash 114 media. The device manager 112 can perform offload management and can provide the device memory addresses or pointers for source and results using a control bus. These addresses can be written by the device manager 112 to a set of registers for this purpose that are accessible to the offloaded functions 118 over the control bus. In another embodiment, the device manager 112 performing offload management in the storage device 104 can also provide device memory pointers to the offloaded functions for scratch pad or temporary purposes.

In various aspects, the device memory 116 may need to have a relatively low overhead memory management that provides functions such as, 1) allocation, 2) de-allocation, 3) free space tracking, 4) garbage collection, 5) memory protection, and 6) others. In one embodiment, such device memory 116 can be managed by the host 102 in a transport agnostic manner. Such a transport agnostic manner can include the disclosed systems treating the device memory 116 as a virtual independent or separate memory address space from the host 102 system memory 108 address space. In another embodiment, such device memory 117 can be fully managed by the storage device 104 itself and the host 102 can refer to the device memory 116 in an abstract manner as needed. The disclosure describes these methods of device memory management further below.

Host Managed Device Memory

In this method, the device memory 116 can be managed by the host 102. In some embodiments, the memory allocations, deallocations, and the like can be performed by the host system software (e.g., applications 106) and conveyed to the storage device 104 through storage commands such as NVMe computational storage commands. The device memory 116 is not mapped into the host 102 system memory 108 address map; rather, it is treated as a separate virtual address space. Various storage commands such as NVMe commands provide the type of the address of source data, or result destination, and device memory address can be one of the types. In this approach, the device memory management can be performed by the host 102. Further, the host can manage the device memory as a flat memory address space starting from an absolute address of 0h that spans the length of the memory. In some respects, the device may place restrictions on page granularity and alignment when the memory is addressed. The host can discover these restrictions as part of discovering device memory and the host can comply with the restrictions while using the device for proper device usage. The device manager 112 can relay the memory pointers received from the host 102 to the offloaded functions 118. In one embodiment, it may be possible for the device manager 112 to perform offload platform management to add or subtract some base addresses from such host-provided device memory addresses before passing them to the offloaded functions 118.

Device Managed Device Memory

In an embodiment, the device memory 116 can be abstracted from the host's 102 point of view and can therefore be managed by the storage device 104 itself. Accordingly, the host system software (e.g., applications 106) may not specify the actual device memory addresses during the offloaded function invocation. In particular, the device can provide an opaque handle to memory allocated and the host addresses this memory by the provided handle and an address offset within that handle which can start at memory address 0h. In various embodiments, based on the length and type of the source data and result destination pointers provided by the host 102 system software, the device manager 112 performs offload platform management and can perform device memory allocation and reservations. The device manager 112 can include a DMA engine that can then fetch the source data, if necessary, and deposit into the allocated device memory buffers. At that point, the device manager 112 may provide those allocated device memory addresses to the respective offloaded function 118, for example, using a control bus. Such memory allocation can be performed during every runtime invocation of the offloaded function. Similarly when the offloaded function 118 completes the data processing, the DMA engine may move the results to the destination addresses outside of device memory 116, if necessary. The DMA engine can then de-allocate the device memory buffers used by the offloaded function 118 during that invocation. The device manager 112 may perform device memory garbage collection at any time to create contiguous blocks of free space.

In some embodiments, an offloaded function 118 may have the requirement that a certain amount of temporary memory space (e.g., so-called scratch pad memory) be allocated for its processing during every invocation. Such fixed memory requirements can be fulfilled by the device manager 112 in the form of offload function registration. In particular, when the offloaded function is loaded into the storage device 104, the offloaded function 118 may communicate such fixed memory requirements upfront to the device manager 112, for example, using the control bus. Further, the device manager 112 can fulfil those requests either permanently or prior to invocation using any suitable protocol.

In another embodiment, it may also be possible that an offloaded function 118 may make temporary memory allocation requests during runtime execution of the function. In particular, an offloaded function 118 may not be able to determine the temporary memory requirements upfront, prior to an invocation. Such dynamic device memory allocation is handled through any suitable control protocol. Further, such dynamic memory allocation requests may be conveyed by the offloaded function 118 over the control bus to the device manager 112. Moreover, the device manager 112 can respond to those requests appropriately over the control bus.

As described earlier, the results of data processing by the offloaded functions 118 reside in the device memory 116 at the time of completion. Those results can be transferred to the appropriate destination location in the system memory 108 or persistent memory (e.g., flash 114) by the DMA engine of the device manager 112. However, it may be possible that the destination address type may indicate that the results be kept in the device memory 116 itself. Such a mechanism can be used by the disclosed systems for chaining or nesting of the offloaded functions 118. When results of one offloaded functions are fed to another offloaded function, the disclosed systems can maintain the results in the device memory 116 and provide the same device memory address as input data source to the next offloaded function. Further, such a method avoids data copying which can add more time latency. In the situation where the destination address type is a device memory, the associated device memory block is not de-allocated, which would be the case otherwise.

In one embodiment, the device manager 112 can manage the device memory 116 as a virtual address space or physical address space. In case of virtual address space the device manager 112 may perform address translation of the device memory 116 accesses by the offloaded functions 118. Using virtual address space method the device manager 112 may be able to offer a contiguous address space to the offloaded function using a set of non-contiguous physical device memory blocks transparently. Further, such techniques may reduce some of the memory garbage collection overhead at the cost of address translations.

In another embodiment, the device manager 112 can perform memory management functions to enforce memory protections. Accordingly, the offloaded functions 118 may need to be protected from accessing each other's memory space. Such privacy and security functionality can allow the disclosed systems to enable secure and robust operation of multiple active offloaded functions. In another embodiment, the device manager 112 may check the addresses of memory transactions of a given offloaded function against the memory address space allocated to it. In one embodiment, the device manager 112 can also provide certain privilege levels so that certain functions can be allowed to access device memory of the other offloaded functions.

Internal Data Transfer Mechanisms

In some embodiments, data transfer with device memory 116 can occur between the storage controller (not shown) for flash data on flash 114 and the system memory 108. In other embodiments, device memory 116 can be used by computational program functions that run on the storage device 104. Since device memory 116 is not exposed/mapped to system memory 108, the computational storage device 104 can employ the following mechanism to address the internal memory for data transfers described above. In particular, the storage device 104 can employ one or more addressing schemes that is specified to host software (e.g., applications 106). Further, the host software application interfaces (e.g., drivers 110) can translate device memory 116 accordingly to instruct the computational storage device 104 on the action to take with the memory 116. Additionally, the memory 116 can be described for data transfers and for executing a computational program function within the storage device 104.

Device Memory Addressing Schemes

In some embodiments, the device memory 116 may be described in the following ways (described below), for example, depending on whether the device memory 116 is host 102 managed or storage device 104 managed. As used herein, addressing can refer to a mechanism to describe full or a part of device memory that does not require a mapping into the host's address space, where the mechanism provided is virtualized for local and remote access. With host 102 managed device memory, device memory can be effectively described by a 64-bit address which can address up to about $2^{64}$ or about 18 EB, which is extensible for future usages. Host software (e.g., applications 106) builds a request to address device memory 116 using this 64-bit address which starts at offset zero that points to the start of memory and then scales through till the end of memory. In one embodiment, the memory increments may be measured at the byte granularity or at a much coarser block granularity which the device may advertise. For example, the disclosed systems can set a block granularity at 512 bytes which means that memory is allocated at the minimal granularity level advertised by the device and also transferred at these same increments to a minimum. As noted, the device memory allocation be host managed or device managed. In case of the device managed device memory, the device provides additional commands to allocate/deallocate memory. In some respects, this mechanism can be similar to block access with disk drives.

Figure 2:
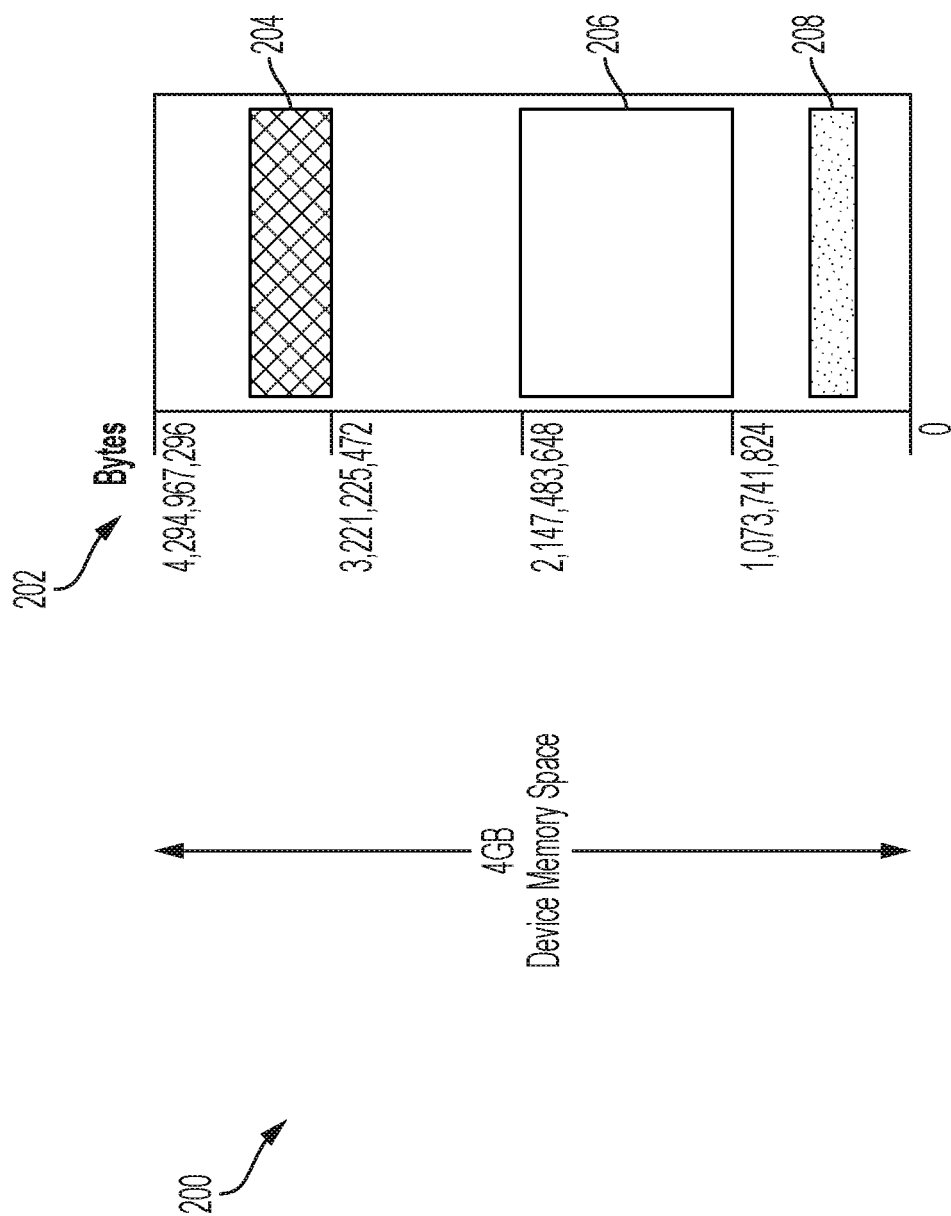
FIG. 2 is an illustration of an exemplary schematic of memory allocations with respective offsets in a device memory space, in accordance with example embodiments of the disclosure.

FIG. 2 is an illustration of an exemplary schematic of memory allocations with respective offsets in a device memory space, in accordance with example embodiments of the disclosure. Diagram 200 shows three memory allocations 202 (204, 206, and 208) and their respective 64-bit offsets in the 4GB device memory space. In this host managed mechanism, the device may choose to apply a hash to the address that encodes the address further as a means of protection. Here, the internal device workings may only work with these translated offsets.

Figure 3:
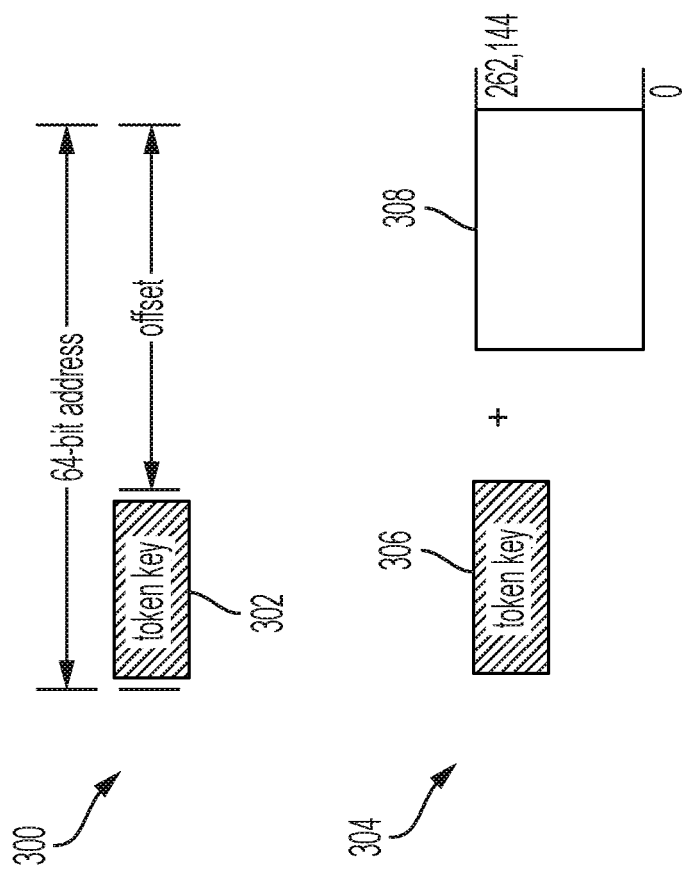
FIG. 3 is an illustration of an exemplary schematic describing aspects of device managed device memory, in accordance with example embodiments of the disclosure.

FIG. 3 is an illustration of an exemplary schematic describing aspects of device managed device memory, in accordance with example embodiments of the disclosure. In another embodiment, with device managed device memory, the memory that is allocated can be managed by the device itself. As shown in diagram 300, on any allocation of a required size requested by host software the device can return a token key (e.g., token key 302) or an opaque memory handle back when successful. In some embodiments, the key along with an offset address may be sufficient to address $2^{64}$ addresses. In some aspects, the memory can include a secure address space, and the host can perform one or more multitenant operations based on the secure address space. In some cases, if the memory is device managed, the address can be secured by the token and/or opaque memory handle where multiple tenants may use the same device memory but with different tokens. For host managed memory, the host can manage multi-tenancy.

As shown in diagram 304, in various embodiments, the one or more host applications can provide the token key 306 along with the offset within the allocated memory 308 to build the unique device memory address. The token key can be private to the device and can be protected if needed. The offset can range anywhere from $2^{12}$ to 1 less than the minimum bits required for token key. FIG. 3 shows how device memory of 256 KB is allocated and used to create an effective address.

Note on Device Memory

In some aspects, the device may have one large memory available for compute programs. However, the device may also make available, in certain instances, more than one memory type. In this case, the disclosed systems can set aside additional bits to denote the memory type. In some respects, the bits can be encoded in a key token such as the token described above.

Host Interface

In various embodiments, the host software interface library can provide an interface to allocate/deallocate device memory. The interface can include additional options to specify which device memory pool to allocate from. Further, the interface provides an abstracted view, where, the inner details of the implementation are hidden from host user for simplicity. In some embodiments, an application programming interface (API) can take the following definition: csAllocMem(device_instance_handle, memory_flags, allocation_size, &returned_handle). Several of the figures below (e.g., FIGS. 4, 5, 6, and 7) represent diagrams that can be used as part of an API used in connection with the disclosed systems.

FIG. 4 is an illustration of an exemplary data structure that the device may advertise its memory management and usage capability, in accordance with example embodiments of the disclosure.

Discovering New Addressing Capability

In various embodiments, the device may advertise its memory management and usage capability so that host software can utilize it. In one embodiment, NVMe devices may provide these details in a data structure 400 such as an identify controller data structure, since this data structure can represent the first data that is queried by a host device driver. In some embodiments, the device may populate a capability as shown FIG. 4. As shown, the data structure 400 includes a computational storage capabilities field 402 and a device memory data granularity field 404.

Figure 5:
FIG. 5 is an illustration of an exemplary commands for using device memory address for direct memory access (DMA), in accordance with example embodiments of the disclosure.

FIG. 5 is an illustration of an exemplary commands for using device memory address for DMA, in accordance with example embodiments of the disclosure. In various embodiments, the disclosed systems can include DMA between device memory and host memory, which can include either a read or a write to device memory, as shown in diagram 500 by the read compute memory 502 and the write compute memory 504 fields. Further, each of these reads or writes can be addressed in the same manner in NVMe for all other fields except the command field.

FIG. 6 is an illustration of an exemplary NVMe command contains transfer details to transfer data between host and device memory which has corresponding fields, in accordance with example embodiments of the disclosure. For example, a protocol-based (e.g., an NVMe-based) Data Pointer Register field (DPTR field) and/or a DMDA field can provide a mechanism to describe host memory. Diagram 600 shows sub-diagram 602 which describes a data pointer (DPTR) field that describes host data pointers, sub-diagram 604 which shows a number of Dwords (NUMD) field that represents the transfer size for command Dwords, and sub-diagram 606 which describes a device memory data address (DMDA) field that represents device data pointers for command Dwords.

In some embodiments, the NVMe command can contain a scatter gather list (SGL) which has the fields as shown and described in FIG. 6. In some aspects, the DPTR field can refer to host memory whose definition is in base specifications. Further, the DMDA field can refer to the device memory specified as a 64-bit address as described above.

Using Device Memory Address for Executing Compute Programs

In various embodiments, compute programs use device memory to access data as input and provide results as output. The device memory may be allocated as described by the schemes described above. Device memory can be represented as 64-bits and the program argument that points can define the memory.

In various embodiments, a compute program as used in connection with the disclosed systems may have one or more arguments which it works with. Arguments may be scalar or vector arguments. Accordingly, the arguments may hold data or be a pointer to device memory. The programs definition has the necessary inputs defined and the command from host will provide that list directly from the host application. The device can interpret each of these arguments as is and pass it down to the program. For example, in the function: foo_function(uint32 size, uint64 src_ptr, unit64 dst_ptr), the host application has passed a 32-bit data value and 2 device memory pointers as part of the command.

FIG. 7 is an illustration of an exemplary special type of scatter gather list (SGL) mechanism is employed to keep memory usage similar for local and remote attached computational storage devices, in accordance with example embodiments of the disclosure. In particular, the device can provide a mechanism for addressing its internal memory used by offloaded programs. The mechanism for some protocols such as Non-Volatile Memory Express (NVMe) can provide an addressing scheme that can be common between a locally attached device (e.g., via Peripheral Component Interconnect Express, PCIe) or a remotely attached device (NVMe over fabric, NVMe-oF). The Host software can make use of this relatively simple and scalable mechanism and need not have to determine how the device is attached while addressing it. In particular, diagram 700 includes an SGL identifier 702 field, a reserved 704 field, a length 706 field, and an offset 708 field. In some aspects, the SGL can provide an SGL identifier 702 to denote the type of descriptor that needs to be used to address device memory. The length 706 field describes the length of the device memory addressed while offset 708 describes the offset within that memory. The reserve 704 field can be kept as a reserved field for future usages.

Using Device Memory Address for Storage I/Os

Regardless of the memory management used to allocate device memory, the disclosed systems describe that memory to the device. In particular, a type of scatter gather list (SGL) mechanism is employed by the disclosed systems to keep memory usage similar for local and remote attached computational storage devices. In various aspects, the system can transfer memory between one device memory location to the next memory location (in the same device). Alternatively or additionally, the system can transfer memory from multiple device locations to the host. In particular, the system can transfer data between one location of device memory to another location in same device memory: certain usages may require transfer of data from one location to the next location. Further, the data may be used by different offloaded programs who may not have access to all memory locations. Moreover, the host in this case can manage the security and multi-tenancy through memory handle abstractions and access restrictions. One example use case can include data loaded from a storage name into device memory. For example, memory A can first get decrypted by the first offloaded program X1 into device memory B. In parallel, another instance of X1 (e.g., an X2 instance) can decrypt device memory C into device memory D. The host may then copy memory B and memory D in device memory location E and present it to offload program Y, for example, to analyze and filter memory B and memory D. In other aspects, the system can transfer between two separate device memory locations: here, the device may have more than one device memories. Additionally, the device can transfer memory between multiple scattered device memory locations to one device memory location on same device memory, which can represent an SGL usage. Further, the device can transfer memory between multiple scattered device memory locations to host memory.

In various embodiments, a SGL Descriptor Type set to a predetermined value (e.g., 9) can denote a type for Compute Memory for Data SGL descriptor. Further, an SGL Descriptor Sub Type for all transfers can be set to another value (e.g., 1) and can operate using the Offset field as an offset from the start of Compute Memory for Data. For example, the Offset field contains an offset from the beginning of the location where Compute Memory for Data is located and whose length defined in Length is governed by the block granularity field. The Offset field which describes a 64-bit address shall be used as described for memory managed by host or device. In another embodiment, various commands (e.g., NVMe I/O commands) may use the SGLs to describe Compute Memory for Data for their operation.

Figure 8:
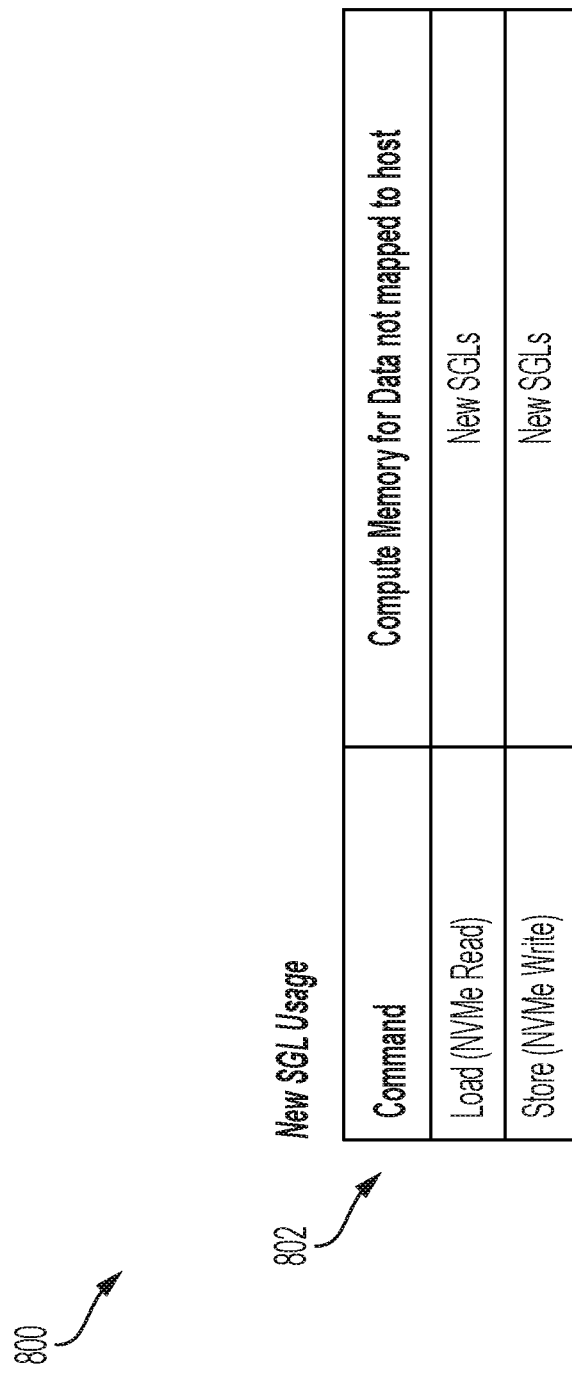
FIG. 8 is an illustration of an exemplary table that includes the interaction of data buffers with I/O commands, in accordance with example embodiments of the disclosure.

FIG. 8 is an illustration of an exemplary table 800 that summarizes interaction of data buffers with NVMe I/O commands, in accordance with example embodiments of the disclosure. The NVMe read and write commands 802 can be defined with corresponding physical region page (PRP) and SGL usages. In particular, embodiments of this disclosure describe load and store commands to transfer data between storage namespaces and device memory. Alternately, NVMe read and write commands may be modified to include using the disclosed device memory addressing scheme. The updated SGL can be substituted for those cases where device memory is addressed.

Figure 9:
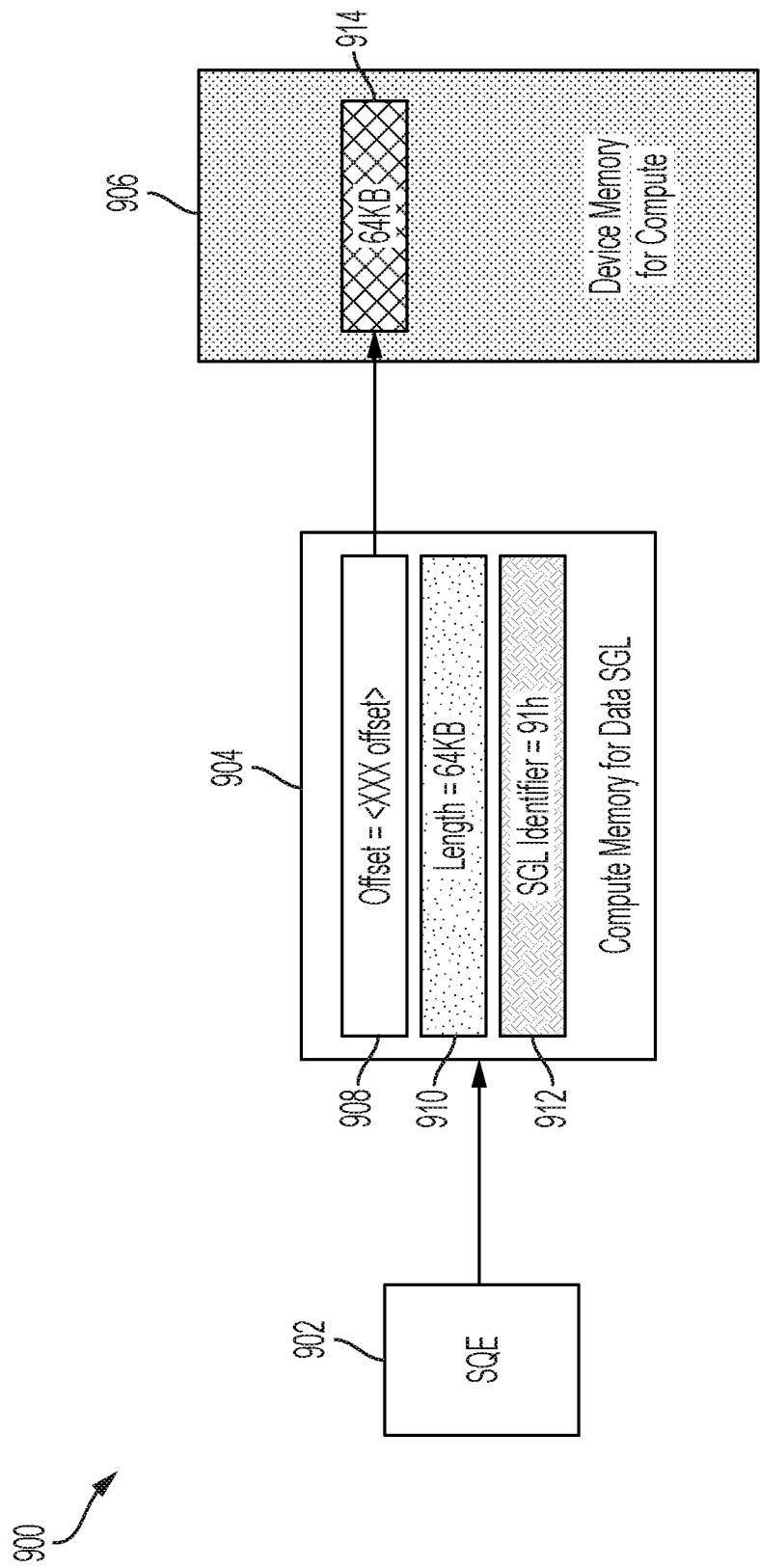
FIG. 9 is an illustration of an exemplary SGL descriptor for data transfer, in accordance with example embodiments of the disclosure.

FIG. 9 is an illustration of an exemplary SGL descriptor for data transfer, in accordance with example embodiments of the disclosure. The following example demonstrates the usage of the described SGL descriptor for data transfer. Diagram 900 shows an SQE 902, the compute memory for data SGL 904, and a device memory for compute 906. The compute memory for data SGL 904 includes predetermined offset 908, length 910, and SGL identifier 912 fields. Further, the device memory for compute 906 includes a 64 KB memory 914. In some cases, NVMe commands can be transferred from the host to device using descriptors defined for each command. These descriptors can be populated in an NVMe submission queue (SQ). Each SQ may support multiple submission queue entries (SQEs). Host software can transfer each request as a descriptor to a free SQE and lets the device know about the work posted to the SQ by ringing its doorbell. In particular, diagram 900 shows that the SQE 902 entry can be populated with a standard NVMe read command and that the Data Pointer (DPTR field) can be updated with the SGL entry that points to device memory (e.g., the 4 KB memory 914). Here, the SGL defines a device memory block at a predetermined offset 908 and a length 910 of 64 KB. The other fields of the SQE are populated with a regular NVMe read. An NVMe read using this SGL can populate the storage read contents directly at the predetermined offset 908. The storage controller can interpret this inner definition.

The mechanisms described herein with this disclosure provide a unique methods to address and access device memory for computational storage devices. These mechanisms are adaptable for local and remote attached devices and are scalable.

Figure 10:
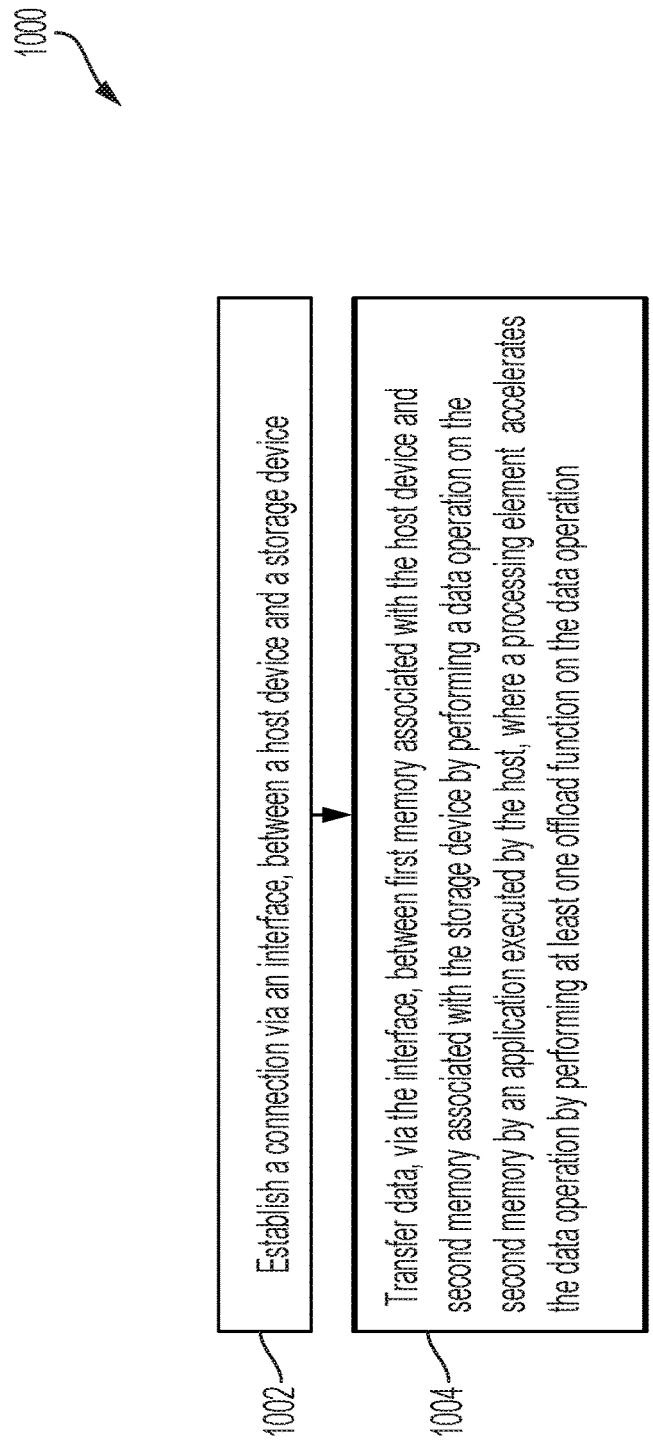
FIG. 10 is an illustration of an exemplary operational flow illustrating example operations associated with the disclosed systems, in accordance with example embodiments of the disclosure.

FIG. 10 is an illustration of an exemplary operational flow 1000 illustrating example operations associated with the disclosed systems, in accordance with example embodiments of the disclosure. In particular, the operational flow 1000 is from the point of view of the system (e.g., as opposed to a host device perspective and/or a storage device perspective). At block 1002, the disclosed systems can establish a connection via an interface (e.g., an API), between a host device and a storage device. At block 1004, the disclosed systems can transfer data, via the interface, between first memory associated with the host device and second memory associated with the storage device by performing a data operation on the second memory by an application executed by the host. Further, the storage device can include a processing element that accelerates the data operation by performing at least one offload function on the data operation.

Figure 11:
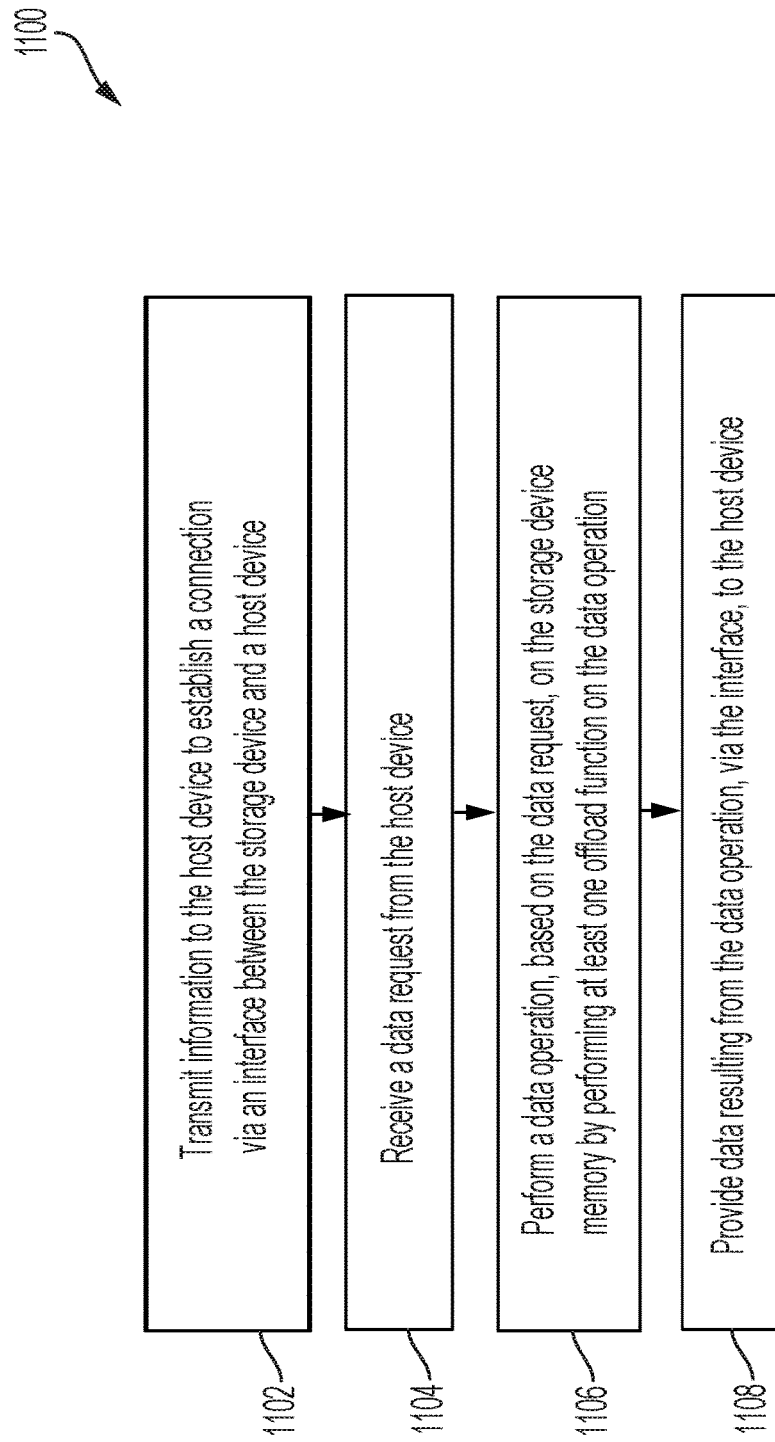
FIG. 11 is an illustration of another exemplary operational flow illustrating example operations associated with the disclosed systems, in accordance with example embodiments of the disclosure.

FIG. 11 is an illustration of another exemplary operational flow 1100 illustrating example operations associated with the disclosed systems, in accordance with example embodiments of the disclosure. In particular, the operational flow 1100 is from the point of view of the storage device (e.g., as opposed to a host device perspective and/or a general system perspective). In particular, at block 1102, the disclosed systems can transmit information to the host device to establish a connection via an interface between the storage device and a host device. At block 1104, the disclosed systems can receive a data request from the host device. At block 1106, the disclosed systems can perform a data operation, based on the data request, on the storage device memory by performing at least one offload function on the data operation. At block 1108, the disclosed systems can provide data resulting from the data operation, via the interface, to the host device.

Figure 12:
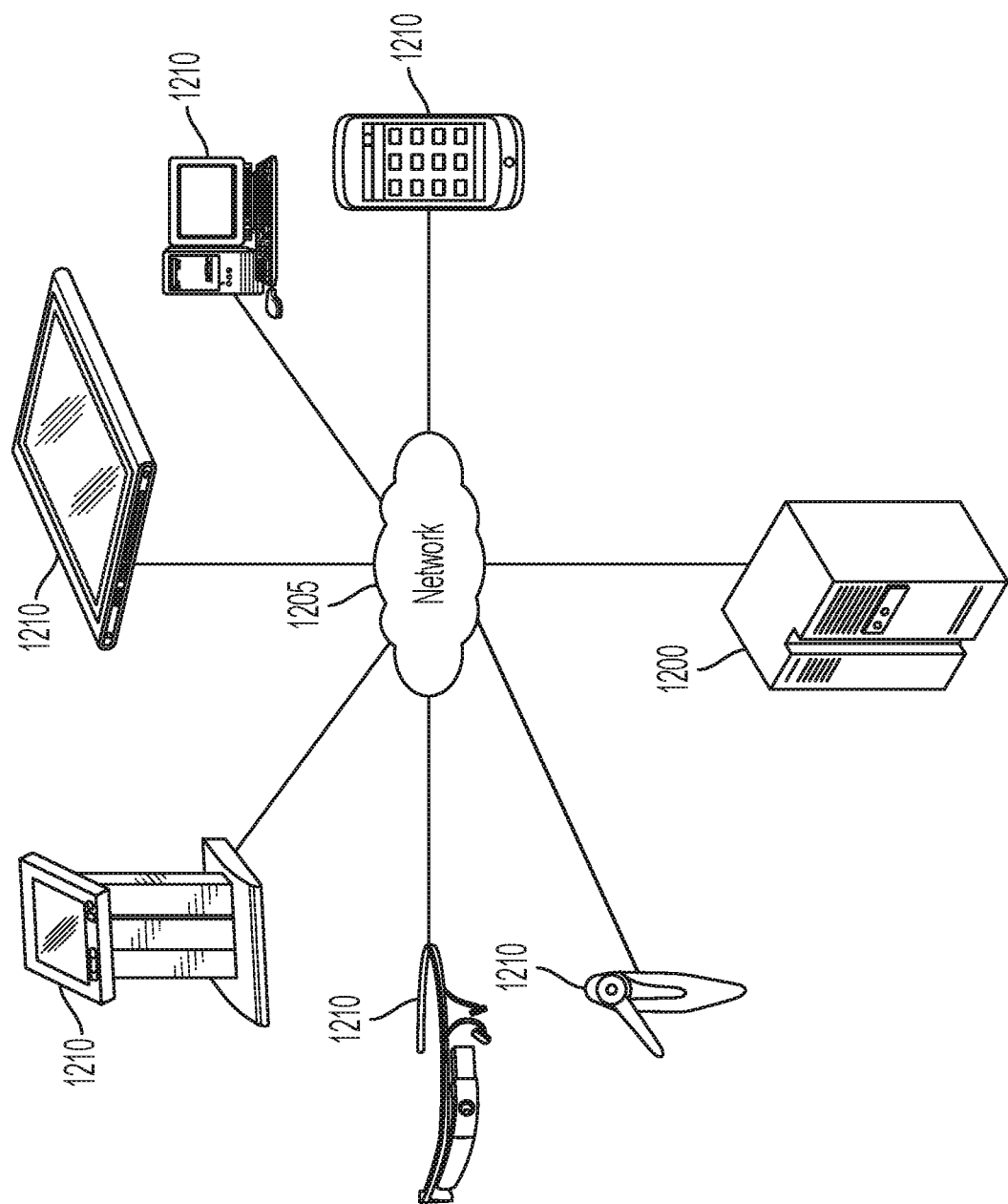
FIG. 12 shows an example schematic diagram of a system that can be used to practice embodiments of the present disclosure.

FIG. 12 shows an example schematic diagram of a system that can be used to practice embodiments of the present disclosure. As shown in FIG. 12, this particular embodiment may include one or more management computing entities 1200, one or more networks 1205, and one or more user devices 1210 (e.g., host devices, storage devices, additional devices, etc.). In various embodiments, the management computing entities 1200 can be configured to run operations associated with the disclosed systems and associated embodiments described throughout the disclosure. Further, the management computing entities 1200 can reside in any suitable portion of the disclosed systems (e.g., such as a storage device manager, host application, a remote host, another device, combinations thereof, and/or the like). Each of these components, entities, devices, systems, and similar words used herein interchangeably may be in direct or indirect communication with, for example, one another over the same or different wired or wireless networks. Additionally, while FIG. 12 illustrates the various system entities as separate, standalone entities, the various embodiments are not limited to this particular architecture. As noted, the communications can be performed using the any suitable protocols described further herein.

Figure 13:
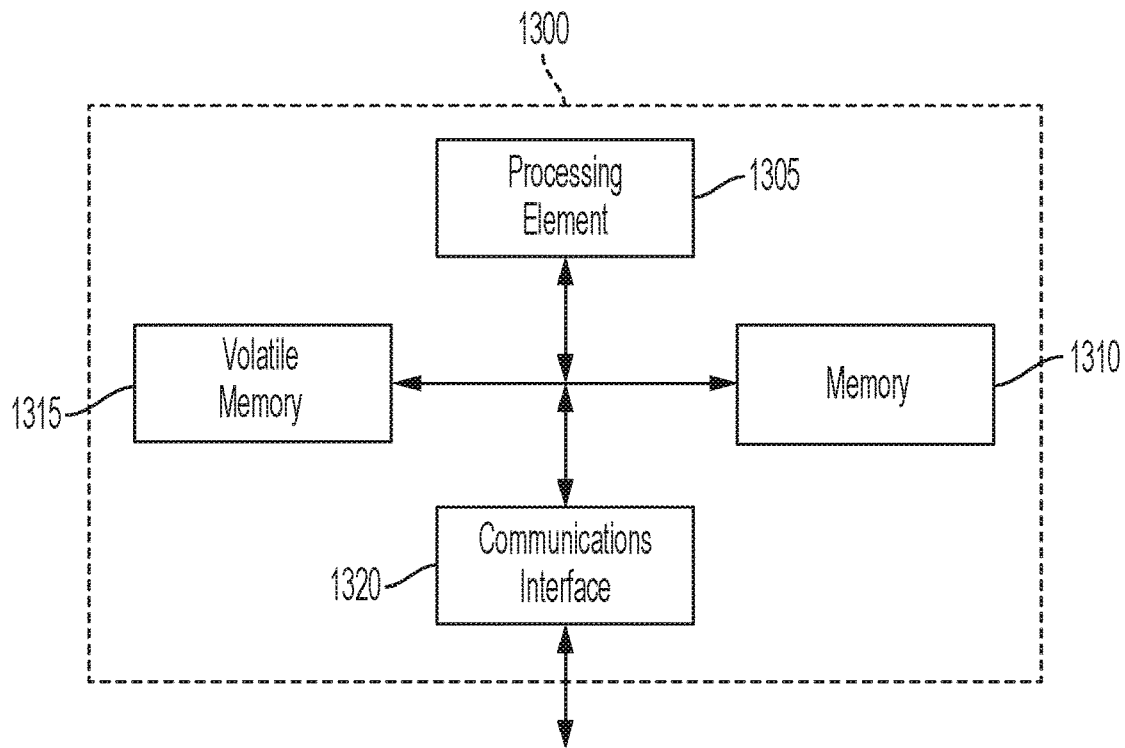
FIG. 13 shows an example schematic diagram of a management computing entity, in accordance with example embodiments of the disclosure.

FIG. 13 shows an example schematic diagram 1300 of a management computing entity, in accordance with example embodiments of the disclosure. As noted, the management computing entity can be configured to run operations associated with the disclosed systems and associated embodiments described throughout the disclosure. Further, the management computing entities 1200 can reside in any suitable portion of the disclosed systems. In particular, a content component may serve to determine signals indicative of data (e.g., video, audio, text, data, combinations thereof, and/or the like) to be transmitted over the system described herein. In another embodiment, the determination of the signal for transmission may be, for example, based on a user input to a device, a predetermined schedule of data transmissions on a network associated with the system, changes in network conditions, and the like. In one embodiment, the signal may include that data may be encapsulated in a data frame and/or packet that is configured to be sent from a device to one or more devices on the network.

In another embodiment, the processing element 1305 may serve to determine various parameters associated data transmitted over the network associated with the disclosed systems. As another example, the processing element 1305 may serve perform various acceleration operations such as at least portions of an offload functionality, data pre- or post-processing, combinations thereof, and/or the like.

In one embodiment, a transmitting component (not shown) may serve to transmit the signal from one device to another device on the network. For example, the transmitting component may serve to prepare a transmitter (e.g., transmitter 1204 of FIG. 12, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 1200 may also include one or more communications interfaces 1320 for communicating with various computing entities, such as by communicating data, content, information, and/or similar terms used herein interchangeably that can be transmitted, received, operated on, processed, displayed, stored, and/or the like. For instance, the management computing entity 1200 may communicate with user devices 1210 and/or a variety of other computing entities.

As shown in FIG. 13, in one embodiment, the management computing entity 1200 may include or be in communication with one or more processing elements 1305 (also referred to as processors, processing circuitry, and/or similar terms used herein interchangeably) that communicate with other elements within the management computing entity 1200 via a bus, for example. As will be understood, the processing element 1305 may be embodied in a number of different ways. For example, the processing element 1305 may be embodied as one or more complex programmable logic devices (CPLDs), microprocessors, multi-core processors, coprocessing entities, application-specific instruction-set processors (ASIPs), microcontrollers, and/or controllers. Further, the processing element 1305 may be embodied as one or more other processing devices or circuitry. The term circuitry may refer to an entirely hardware embodiment or a combination of hardware and computer program products. Thus, the processing element 1305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1305 may be configured for a particular use or configured to execute instructions stored in volatile or non-volatile media or otherwise accessible to the processing element 1305. As such, whether configured by hardware or computer program products, or by a combination thereof, the processing element 1305 may be capable of performing steps or operations according to embodiments of the present disclosure when configured accordingly.

In one embodiment, the management computing entity 1200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 1310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the management computing entity 1200 may further include or be in communication with volatile media (also referred to as volatile storage, memory, memory storage, memory circuitry and/or similar terms used herein interchangeably). In one embodiment, the volatile storage or memory may also include one or more volatile storage or memory media 1315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 1305. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 1200 with the assistance of the processing element 1305 and operating system.

As indicated, in one embodiment, the management computing entity 1200 may also include one or more communications interfaces 1320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as peripheral component interconnect express (PCIe), fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 1200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zig-Bee, Bluetooth protocols, 5G protocol, wireless universal serial bus (USB) protocols, and/or any other wireless protocol.

Although not shown, the management computing entity 1200 may include or be in communication with one or more input elements, such as a keyboard input, a mouse input, a touch screen/display input, motion input, movement input, audio input, pointing device input, joystick input, keypad input, and/or the like. The management computing entity 1200 may also include or be in communication with one or more output elements (not shown), such as audio output, video output, screen/display output, motion output, movement output, and/or the like.

As will be appreciated, one or more of the management computing entity's 1200 components may be located remotely from other management computing entity 1200 components, such as in a distributed system. Furthermore, one or more of the components may be combined and additional components performing functions described herein may be included in the management computing entity 1200. Thus, the management computing entity 1200 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 1210 that includes one or more components that are functionally similar to those of the management computing entity 1200.

In various aspects, the processing component, the transmitting component, and/or the receiving component (not shown) may be configured to operate on one or more may include aspects of the functionality of the management computing entity 1200, as shown and described in connection with FIGS. 12 and 13 here. In particular, the processing component, the transmitting component, and/or the receiving component may be configured to be in communication with one or more processing elements 1305, memory 1310, volatile memory 1315, and may include a communication interface 1320 (e.g., to facilitate communication between devices).

Figure 14:
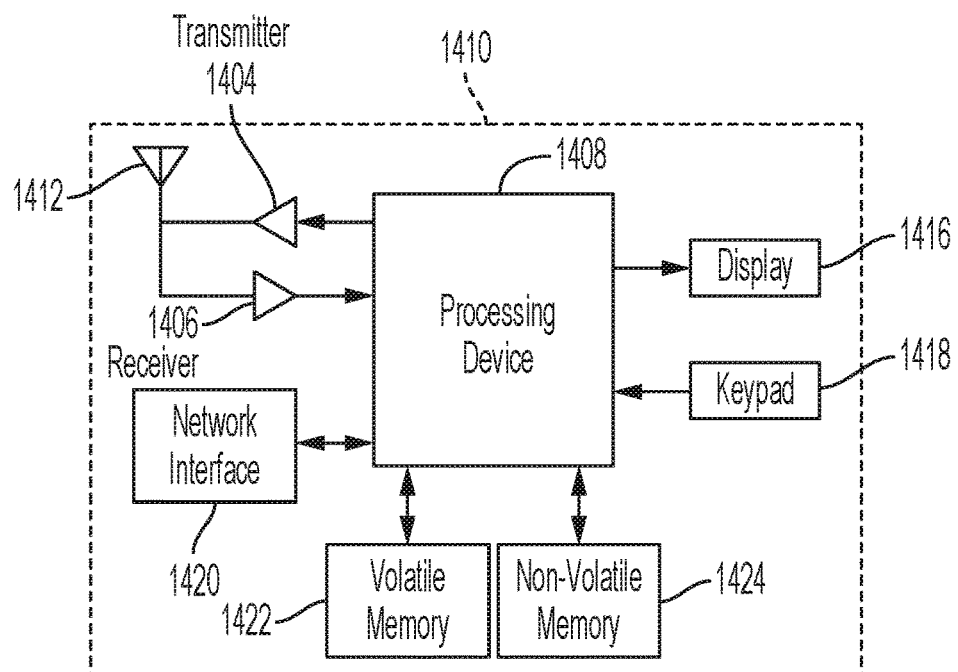
FIG. 14 shows an example schematic diagram of a user device, in accordance with example embodiments of the disclosure.

FIG. 14 shows an example schematic diagram of a user device, in accordance with example embodiments of the disclosure. FIG. 14 provides an illustrative schematic representative of a user device 1410 (e.g., a host device, a storage device, a peripheral device, etc.) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

User devices 1410 can be operated by various parties. As shown in FIG. 14, the user device 1410 can include an antenna 1412, a transmitter 1404 (for example radio), a receiver 1406 (for example radio), and a processing element 1408 (for example CPLDs, FPGAs, microprocessors, multi-core processors, coprocessing entities, ASIPs, microcontrollers, and/or controllers) that provides signals to and receives signals from the transmitter 1404 and receiver 1406, respectively.

The signals provided to and received from the transmitter 1404 and the receiver 1406, respectively, may include signaling information in accordance with air interface standards of applicable wireless systems. In this regard, the user device 1410 may be capable of operating with one or more air interface standards, communication protocols, modulation types, and access types. More particularly, the user device 1410 may operate in accordance with any of a number of wireless communication standards and protocols, such as those described above with regard to the management computing entity 1400 of FIG. 14. In a particular embodiment, the user device 1410 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, 5G, Wi-Fi, Wi-Fi Direct, WiMAX, UWB, IR, NFC, Bluetooth, USB, and/or the like. Similarly, the user device 1410 may operate in accordance with multiple wired communication standards and protocols, such as those described above with regard to the management computing entity 1400 via a network interface 1420.

Via these communication standards and protocols, the user device 1410 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 1410 can also download changes, add-ons, and updates, for instance, to its firmware, software (for example including executable instructions, applications, program components), and operating system.

According to one embodiment, the user device 1410 may include location determining aspects, devices, components, functionalities, and/or similar words used herein interchangeably. The location determining aspects may be used to inform the models used by the management computing entity and one or more of the models and/or machine learning techniques described herein. For example, the user device 1410 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 1410 position in connection with a variety of other systems, including cellular towers, Wi-Fi access points, and/or the like. Similarly, the user device 1410 may include indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 1410 may also comprise a user interface (that can include a display 1416 coupled to a processing element 1408) and/or a user input interface (coupled to a processing element 1408). For example, the user interface may be a user application, browser, user interface, and/or similar words used herein interchangeably executing on and/or accessible via the user device 1410 to interact with and/or cause display of information from the management computing entity 1400, as described herein. The user input interface can comprise any of a number of devices or interfaces allowing the user device 1410 to receive data, such as a keypad 1418 (hard or soft), a touch display, voice/speech or motion interfaces, or other input devices. In embodiments including a keypad 1418, the keypad 1418 can include (or cause display of) the conventional numeric (0-9) and related keys (#, *), and other keys used for operating the user device 1410 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 1410 can also include volatile storage or memory 1422 and/or non-volatile storage or memory 1424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 1410. As indicated, this may include a user application that is resident on the entity or accessible through a browser or other user interface for communicating with the management computing entity 1400 and/or various other computing entities.

In another embodiment, the user device 1410 may include one or more components or functionality that are the same or similar to those of the management computing entity 1400, as described in greater detail above. As will be recognized, these architectures and descriptions are provided for example purposes only and are not limiting to the various embodiments.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method to manage memory, the method comprising:
    establishing a connection, via an interface, between a host device and a storage device; and
    transferring data, via the interface, from first memory associated with the host device to second memory associated with the storage device,
    wherein the interface comprises an application programming interface (API), and the host device allocates the second memory using at least one command associated with the API;
    wherein the storage device includes a flash storage and a processing element that accelerates a data operation by performing at least one offload function on the data operation of an application,
    wherein the data operation is performed on the data by the storage device,
    wherein the data is transferred between the first memory and the second memory based at least in part on the at least one offload function, and
    wherein the at least one offload function is based at least in part on the data operation of the application.

2. The method of claim 1, wherein the host device allocates the second memory using a fine-grained allocation scheme or a coarse-grained allocation scheme.

3. The method of claim 1, wherein the method further comprises addressing the second memory and the transferring data is based at least in part on the addressing of the second memory.

4. The method of claim 1, wherein the second memory comprises a secure address space, wherein the method further comprises host device performing one or more multitenant operations based on the secure address space, and wherein the secure address space protects the data of a first tenant from access by a second tenant.

5. The method of claim 1, wherein the storage device comprises a non-volatile memory express (NVMe) enabled storage device and the data operation is performed using a scatter gather list (SGL).

6. The method of claim 1, wherein the performing the data operation further comprises the storage device transferring data from persistent memory associated with the storage device to the second memory.

7. The method of claim 1, wherein the transferring data further comprises the host device providing information regarding the first memory's layout to the storage device.

8. The method of claim 1, wherein the transferring data further comprises the storage device providing information regarding the storage device's memory layout for read and write operations to the host device.

9. The method of claim 1, wherein the establishing the connection comprises a discovery and setup process.

10. The method of claim 1, wherein the offload function accesses a result of the data operation from the second memory associated with the storage device.

11. A non-transitory computer-readable medium storing computer-executable instructions for managing memory which, when executed by a processor, cause the processor to perform operations comprising:
 establishing a connection, via an interface, between a host device and a storage device; and
 transferring data, via the interface, from first memory associated with the host device to second memory associated with the storage device,
 wherein the interface comprises an application programming interface (API), and the host device allocates the second memory using at least one command associated with the API;
 wherein the storage device includes a flash storage and a processing element that accelerates a data operation by performing at least one offload function on the data operation of an application,
 wherein the data operation is performed on the data by the storage device,
 wherein the data is transferred between the first memory and the second memory based at least in part on the at least one offload function, and
 wherein the at least one offload function is based at least in part on the data operation of the application.

12. The non-transitory computer-readable medium of claim 11, wherein the computer-executable instructions further cause the processor to perform operations comprising addressing the second memory, and the transferring data is based at least in part on the addressing of the second memory.

13. The non-transitory computer-readable medium of claim 11, wherein the second memory comprises a secure address space, wherein the host device performs one or more multitenant operations based on the secure address space and wherein the secure address space protects the data of a first tenant from access by a second tenant.

14. The non-transitory computer-readable medium of claim 11, wherein the storage device comprises a non-volatile memory express (NVMe) enabled storage device and the data operation is performed using a scatter gather list (SGL).

15. The non-transitory computer-readable medium of claim 11, wherein the data operation further comprises the storage device transferring data from persistent memory associated with the storage device to the second memory.

16. A system for managing memory, comprising:
 a host device comprising a first memory and an application;
 a storage device comprising a device manager, a flash storage, a processing element, and a second memory;
 wherein the system stores computer-executable instructions which, when executed by a processor, cause the processor to perform operations comprising:
  establishing a connection, via an interface, between the host device and the storage device; and
  transferring data, via the interface, from first memory associated with the host device to second memory associated with the storage device,
 wherein the interface comprises an application programming interface (API), and the host device allocates the second memory using at least one command associated with the API;
 wherein the device manager configures the processing element to accelerate a data operation by performing at least one offload function on the data operation of an application,
 wherein the data operation is performed on the data by the processing element,
 wherein the data is transferred between the first memory and the second memory based at least in part on the at least one offload function, and
 wherein the at least one offload function is based at least in part on the data operation of the application.

17. The system of claim 16, wherein the storage device transfers second data, via the interface, between at least a third memory associated with the storage device and a fourth memory associated with the storage device.

18. The system of claim 16, wherein the storage device transfers second data, via the interface, between at least a third memory associated with the storage device and a fourth memory associated with the host device.

* * * * *